(12) United States Patent
Kuwabawa et al.

(10) Patent No.: US 6,323,263 B1
(45) Date of Patent: Nov. 27, 2001

(54) SEMICONDUCTOR SEALING LIQUID EPOXY RESIN COMPOSITIONS

(75) Inventors: Haruyoshi Kuwabawa; Kazuaki Sumita; Toshio Shiobara, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/708,682

(22) Filed: Nov. 9, 2000

(30) Foreign Application Priority Data

Nov. 11, 1999 (JP) .................................. 11-321745

(51) Int. Cl.[7] .............................. C08K 3/36; C08L 63/02
(52) U.S. Cl. .................. 523/443; 257/789; 257/794; 257/795; 428/620; 523/444
(58) Field of Search ....................................... 523/400, 443, 523/444; 428/620; 257/789, 794, 795

(56) References Cited

U.S. PATENT DOCUMENTS

| | | |
|---|---|---|
| 4,877,822 | 10/1989 | Itoh et al. . |
| 4,902,732 | 2/1990 | Itoh et al. . |
| 5,089,440 | 2/1992 | Christie et al. . |
| 5,292,688 | 3/1994 | Hsiao et al. . |
| 5,298,595 | 3/1994 | Reimann et al. . |
| 6,083,774 * | 7/2000 | Shiobara ............................ 438/108 |

* cited by examiner

*Primary Examiner*—Robert Dawson
*Assistant Examiner*—D. Aylward
(74) *Attorney, Agent, or Firm*—Birch, Stewart, Kolasch & Birch, LLP

(57) ABSTRACT

In a semiconductor-sealing liquid epoxy resin composition comprising (A) a liquid epoxy resin, (B) a curing agent, and (C) an inorganic filler, the inorganic filler has such a controlled particle size distribution that the composition provides improved interstitial infiltration and has a low modulus of elasticity in the cured state.

2 Claims, 4 Drawing Sheets

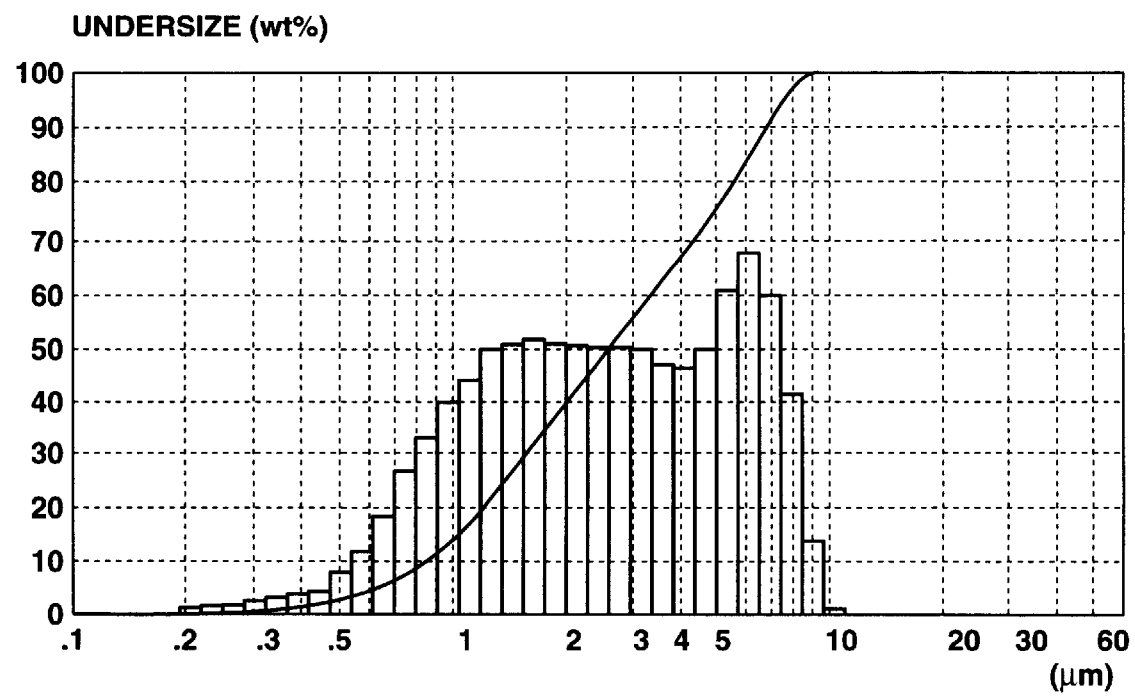

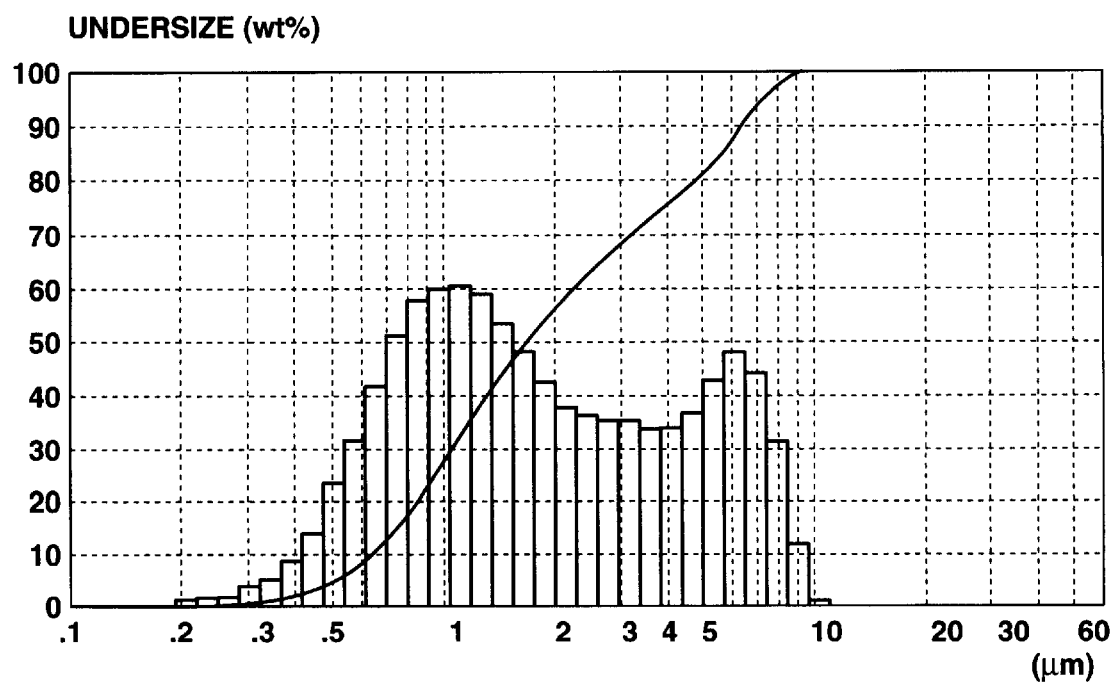

SEMICONDUCTOR SEALING LIQUID EPOXY RESIN COMPOSITIONS

This invention relates to liquid epoxy resin compositions for use with semiconductor devices as potting and coating materials, and more particularly, to liquid epoxy resin compositions having improved storage stability and interstitial infiltration and suitable for use with flip-chip type semiconductor devices as underfill material.

BACKGROUND OF THE INVENTION

With the advance of electric equipment toward smaller size, lighter weight and higher performance, the semiconductor mounting technology has changed from the pin mating type to the surface mounting which now becomes the mainstream. One bare chip mounting technology is flip-chip (FC) mounting. The flip-chip mounting is a technique of providing an LSI chip on its circuit pattern-bearing surface with several to several thousands of electrodes, known as bumps, of about 10 to 100 microns high and joining the chip to electrodes on a substrate with a conductive paste or solder. Then the sealing material used for the protection of FC devices must penetrate into gaps of several tens of microns (typically about 40 to 20 μm) defined by bumps between the substrate and the LSI chip. Conventional liquid epoxy resin compositions used as the underfill material for flip-chip devices are generally composed of a liquid epoxy resin, a curing agent and an inorganic filler. Of these, the most predominant is a composition in which a large amount of inorganic filler is blended in order to provide a matching coefficient of linear expansion with those of semiconductor chips, substrates and bumps for increased reliability.

The flip-chip underfill materials with high loading of inorganic filler suffer from very low productivity since they penetrate into a narrow gap, usually of about 40 to 20 μm, at a very slow rate. There is a desire to overcome this problem. It is presumed that the inorganic filler can accommodate the narrow gap penetration as its particle size decreases. However, the cured composition loaded with inorganic filler of a smaller particle size tends to peel and crack because the cured product has an increased modulus of elasticity to prevent easy relaxation of stresses therein.

SUMMARY OF THE INVENTION

An object of the invention is to provide a novel and improved liquid epoxy resin composition having improved interstitial infiltration, curing into a low modulus product and suitable in sealing semiconductor devices therewith in a reliable manner.

According to the invention, there is provided a semiconductor-sealing liquid epoxy resin composition, comprising (A) a liquid epoxy resin, (B) a curing agent, and (C) an inorganic filler. The inorganic filler contains up to 1% by weight of particles having a particle size of at least 45 μm, has a mean particle size of 1 to 5 μm, and has a particle size distribution having a peak in a particle size range of 0.5 to 2 μm and a peak in a particle size range of 5 to 10 μm wherein the content in % by weight of particles falling within the particle size range of 0.5 to 2 μm divided by the content in % by weight of particles falling within the particle size range of 5 to 10 μm is from 1 to 20. The composition exhibits improved interstitial infiltration and has a low modulus of elasticity in the cured state.

Spherical silica is typically used as the inorganic filler in the underfill material because of its flow. If the filler contains a substantial amount of particles which are larger than the gap, such large particles are intercepted at the gate to further reduce the infiltration cross-section and exacerbate the infiltration capability. By substantially removing particles having a maximum particle size of 45 μm or greater and controlling the mean particle size to the range of 1 to 5 μm, there are obtained particles which can effectively penetrate through the narrow gap. Any increase in modulus of elasticity due to a reduction of particle size is precluded by a choice of particle size distribution. The particles have a particle size distribution having a peak in a particle size range of 0.5 to 2 μm and a peak in a particle size range of 5 to 10 μm. Additionally, the ratio of the content (X) in % by weight of particles falling within the particle size range of 0.5 to 2 μm to the content (Y) in % by weight of particles falling within the particle size range of 5 to 10 μm is controlled to the range from 1/1 to 20/1. This choice is effective for achieving stress relaxation in the cured composition.

The semiconductor-sealing liquid epoxy resin composition exhibits effective interstitial infiltration and cures into a product having a low modulus of elasticity.

BRIEF DESCRIPTION OF THE DRAWINGS

FIG. 1 is a diagram showing a particle size distribution of silica particles in Example 1.

FIG. 2 is a diagram showing a particle size distribution of silica particles in Example 2.

FIG. 3 is a diagram showing a particle size distribution of silica particles in Example 3 and Comparative Example 2 prior to the addition of oversize particles.

FIG. 4 is a diagram showing a particle size distribution of silica particles in Example 4.

DESCRIPTION OF THE PREFERRED EMBODIMENT

Figure 5:
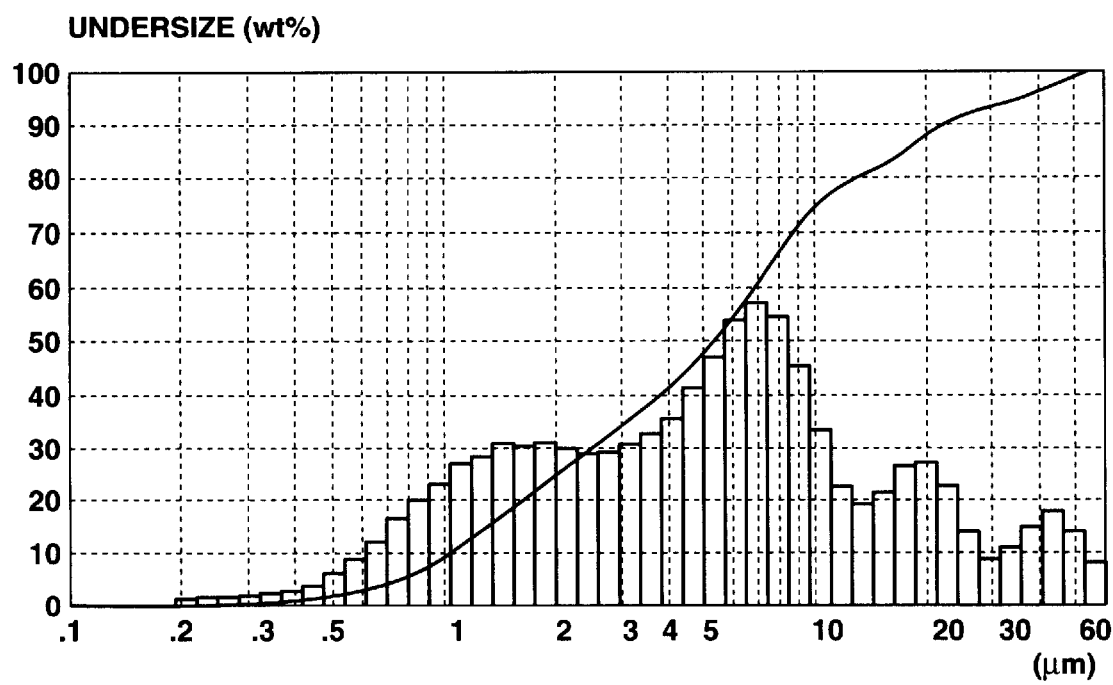
FIG. 5 is a diagram showing a particle size distribution of silica particles in Comparative Example 1.

The semiconductor-sealing liquid epoxy resin composition according to the invention contains (A) a liquid epoxy resin, (B) a curing agent, and (C) an inorganic filler.

The liquid epoxy resin used as component (A) may be any epoxy resin as long as it has at least two epoxy groups in a molecule. Preferred examples include bisphenol type epoxy resins such as bisphenol A type epoxy resins and bisphenol F type epoxy resins, novolac type epoxy resins such as phenol novolac type epoxy resins and cresol novolac type epoxy resins, naphthalene type epoxy resins, biphenyl type epoxy resins, and cyclopentadiene type epoxy resins. Of these, those epoxy resins which are liquid at room temperature (25° C.) are used, and the bisphenol type epoxy resins such as bisphenol A type epoxy resins and bisphenol F type epoxy resins are desirable. Any of epoxy resins of the following structure may be added to the foregoing epoxy resins in such an amount as not to adversely affect the interstitial infiltration thereof.

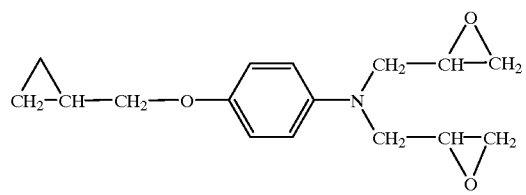

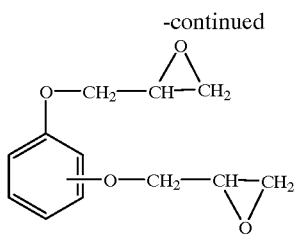

The liquid epoxy resins preferably have a total chlorine content of up to 1,500 ppm, and especially up to 1,000 ppm. The epoxy resin preferably has a water-extracted chlorine content of up to 10 ppm when chlorine is extracted from the epoxy resin with water at an epoxy resin concentration of 50% and a temperature of 100° C. over a period of 20 hours. At a total chlorine content of greater than 1,500 ppm or a water-extracted chlorine level of more than 10 ppm, the semiconductor device would become less reliable, especially in the presence of moisture.

A curing agent as component (B) may be selected from well-known ones although acid anhydrides are preferred. Exemplary acid anhydrides are those of about 4 to 25 carbon atoms, preferably about 8 to 20 carbon atoms, preferably containing one or two aliphatic or aromatic rings and one or two acid anhydride groups

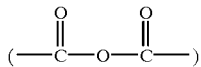

in a molecule, such as tetrahydrophthalic anhydride, methyitetrahydrophthalic anhydride, methylhexahydrophthalic anhydride, hexahydrophthalic anhydride, methylhymic anhydride, pyromellitic acid dianhydride, benzophenonetetracarboxylic acid dianhydride, 3,3',4,4'-biphenyltetracarboxylic acid dianhydride, bis(3,4-dicarboxyphenyl)ether dianhydride, bis(3,4-dicarboxyphenyl)methane dianhydride, and 2,2-bis(3,4-dicarboxyphenyl)propane dianhydride.

Where an acid anhydride is used as the curing agent, it is preferably blended so as to give 0.3 to 0.7 mol of acid anhydride groups

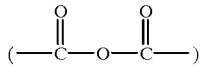

per mol of epoxy groups in the epoxy resin. Less than 0.3 mol of acid anhydride groups would provide insufficient cure whereas an amount giving more than 0.7 mol of acid anhydride groups would leave part of the acid anhydride unreacted, which leads to a drop of glass transition temperature. It is more desirable that 0.4 to 0.6 mol of acid anhydride groups be available per mol of epoxy groups in the epoxy resin.

As the curing agent, dicyandiamide and carboxylic acid hydrazides such as adipic acid hydrazide and isophthalic acid hydrazide are also useful.

If desired, a curing accelerator is optionally used. Illustratively, one or more curing accelerators selected from imidazole compounds, tertiary amine compounds, and organic phosphorus compounds may be blended. Exemplary imidazole compounds are 2-methylimidazole, 2-ethylimidazole, 4-methylimidazole, 4-ethylimidazole, 2-phenylimidazole, 2-phenyl-4-methylimidazole, 2-phenyl-4-hydroxymethylimidazole, 2-ethyl-4-methylimidazole, 1-cyanoethyl-2-methylimidazole, 2-phenyl-4-methyl-5-hydroxymethylimidazole, and 2-phenyl-4,5-dihydroxymethylimidazole. Exemplary tertiary amine compounds are amine compounds having alkyl or aralkyl groups as the substituent attached to the nitrogen atom such as triethylamine, benzyltrimethylamine, and α-methylbenzyldimethylamine; cycloamidine compounds and salts thereof with organic acids such as 1,8-diazabicyclo[5.4.0]undecene-7 and the phenol salt, octylic acid salt, and oleic acid salt thereof; salts or complex salts of cycloamidine compounds with quaternary boron compounds such as the compound represented by the following formula.

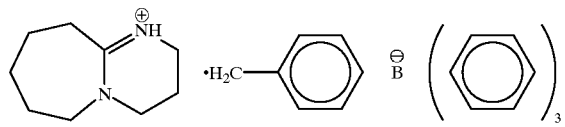

Exemplary organic phosphorus compounds are triorganophosphine compounds such as triphenylphosphine, and quaternary phosphonium salts such as tetraphenylphosphonium tetraphenyl borate.

An appropriate amount of the curing accelerator blended is 0 to 10 parts, preferably 0.01 to 10 parts, and more desirably 0.5 to 5 parts by weight per 100 parts by weight of the epoxy resin and curing agent combined. Less than 0.01 part of the curing accelerator may not be effective for accelerating cure whereas more than 10 parts is effective for accelerating cure, but tends to detract from storage stability.

In the epoxy resin composition, any of well-known inorganic fillers is added as component (C) for the purpose of reducing a coefficient of expansion. Useful inorganic fillers include fused silica, crystalline silica, alumina, boron nitride, aluminum nitride, silicon nitride, magnesia, and magnesium silicate.

According to the invention, the inorganic filler contains up to 1% (i.e., 0 to 1%) by weight of particles having a particle size of at least 45 μm and has a mean particle size of 1 to 5 μm. The inorganic filler has a particle size distribution in which peaks appear in a particle size range of 0.5 to 2 μm and a particle size range of 5 to 10 μm, respectively, and the content (X) in % by weight of particles falling within the particle size range of 0.5 to 2 μm divided by the content (Y) in % by weight of particles falling within the particle size range of 5 to 10 μm, that is, X/Y is from 1 to 20, and preferably from 1.5 to 10.

The mean particle size as used herein can be determined, for example, as the weight average (median diameter) in the particle size distribution as measured by the laser light diffraction method.

More specifically, the inorganic filler has a mean particle size of 1 to 5 μm and preferably 1.2 to 2.5 μm. The content of particles having a particle size of at least 45 μm is not more than 1% by weight and preferably not more than 0.5% by weight. A mean particle size of more than 5 μm provides a greater resistance to flow. A mean particle size of less than 1 μm leads to a higher viscosity. If the content of particles having a particle size of at least 45 μm is more than 1% by weight, there is a likelihood that large particles are intercepted at the gate to reduce the infiltration cross-section and exacerbate the infiltration capability. With respect to the particle size distribution of the inorganic filler, it is requisite that peaks (X and Y) appear in a particle size range of 0.5 to 2 μm and a particle size range of 5 to 10 μm, respectively, and the ratio of the content (X) in % by weight of particles falling within the particle size range of 0.5 to 2 μm to the content (Y) in % by weight of particles falling within the particle size range of 5 to 10 μm, that is, X/Y fall in the range from 1/1 to 20/1, and preferably from 1.5/1 to 10/1. If the top size shifts to a larger particle size, more particles are intercepted at the gate. If the top size shifts to a smaller particle size, the viscosity becomes excessive to exacerbate infiltration.

The inorganic filler is preferably blended in an amount of about 100 to 400 parts, more preferably about 150 to 250 parts by weight per 100 parts by weight of the epoxy resin and curing agent combined. On this basis, less than 100 parts of the inorganic filler would provide an epoxy resin composition with a greater coefficient of expansion so that cracks may be incurred in a thermal cycling test. An epoxy resin composition with more than 400 parts of the inorganic filler would be too viscous, restraining its infiltration in thin film form.

In the epoxy resin composition, silicone rubber, silicone oil, liquid polybutadiene rubber or a thermoplastic resin such as methyl methacrylate-butadiene-styrene copolymer may be blended for the purpose of stress reduction. The preferred stress reducing agent is a copolymer obtained through addition reaction between an epoxy or phenolic resin having alkenyl groups and an organohydrogenpolysiloxane represented by the following average compositional formula (1) and having 10 to 400 silicon atoms, preferably 40 to 200 silicon atoms, and 1 to 5 SiH groups, preferably 2 SiH groups (i.e., hydrogen atoms attached to silicon atoms) per molecule. The addition reaction takes place between alkenyl groups on the epoxy or phenolic resin and SiH groups on the organopolysiloxane.

$$H_a R_b SiO_{(4-a-b)/2} \tag{1}$$

Herein R is a substituted or unsubstituted monovalent hydrocarbon group, a is a positive number of 0.005 to 0.1, b is a positive number of 1.8 to 2.2, and $1.81 \leq a+b \leq 2.3$.

The monovalent hydrocarbon groups (attached to silicon atoms) represented by R are preferably those of 1 to 10 carbon atoms, especially 1 to 8 carbon atoms, for example, alkyl groups such as methyl, ethyl, propyl, isopropyl, butyl, isobutyl, tert-butyl, hexyl, cyclohexyl, octyl, and decyl; alkenyl groups such as vinyl, allyl, propenyl, butenyl, and hexenyl; aryl groups such as phenyl, xylyl and tolyl; and aralkyl groups such as benzyl, phenylethyl and phenylpropyl. Also included are halogen-substituted monovalent hydrocarbon groups wherein some or all of the hydrogen atoms in the foregoing hydrocarbon groups are replaced by halogen atoms such as chlorine, fluorine and bromine, for example, chloromethyl, bromoethyl and trifluoropropyl.

Preferred copolymers are those of the following structures.

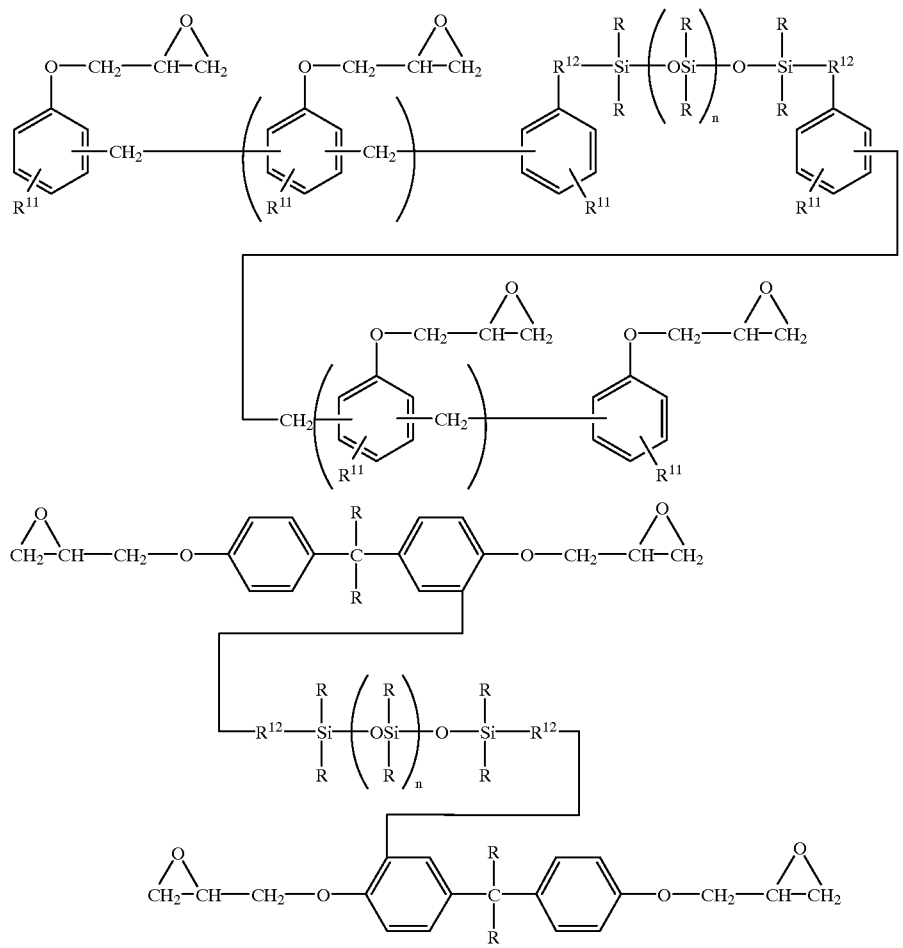

Herein, R is as defined above, $R^{11}$ is hydrogen or alkyl of 1 to 4 carbon atoms, $R^{12}$ is —$CH_2CH_2CH_2$—, —$OCH_2$—$CH(OH)$—$CH_2$—$O$—$CH_2CH_2CH_2$— or —$O$—$CH_2CH_2CH_2$—, n is an integer of 8 to 398, preferably 38 to 198, p is an integer of 1 to 10, and q is an integer of 1 to 10.

The copolymer is blended in such amounts that 0 to 20 parts, especially 2 to 15 parts by weight of diorganopolysiloxane units are available per 100 parts by weight of the liquid epoxy resin and curing agent combined. A further stress reduction is then expectable.

In the liquid epoxy resin composition, suitable additives, for example, carbon-functional silanes for improving tackiness, pigments (e.g., carbon black), dyestuffs, and antioxidants are blended if desired.

The epoxy resin composition according to the invention can be prepared, for example, by simultaneously or separately agitating, dissolving, mixing and dispersing the epoxy resin, curing agent, inorganic filler and optionally, curing accelerator while heating if desired. The device for mixing, agitating and dispersing the ingredients is not critical although an attritor, three-roll mill, ball mill or planetary mixer each equipped with agitating and heating means is generally used. A suitable combination of these devices is also useful.

The liquid epoxy resin composition is used in the sealing of semiconductor devices as a potting or coating material. The composition is especially suitable as an underfill material for use with flip-chip type semiconductor devices.

Preferably, the liquid epoxy resin composition has a viscosity of less than about 10,000 poises at 25° C.

The method and conditions of molding the composition for sealing semiconductor devices are as conventional. Particularly when the composition is used as an underfill material to seal a device by causing the composition to infiltrate into gaps in the device, the temperature is preferably set in the range of about 60 to 120° C., especially about 70 to 100° C. Below 60° C., the composition may remain too viscous to penetrate into the gap between substrate and chip. Above 120° C., undesired reaction can take place, interfering with infiltration. After infiltration and sealing, the resin composition is preferably molded and cured at about 150° C. for about ½ to 2 hours.

EXAMPLE

Examples of the invention are given below by way of illustration and not by way of limitation. All parts are by weight.

Examples 1–4

Epoxy resin compositions were prepared by uniformly mixing 22.5 parts of a bisphenol A type epoxy resin (RE310 by Nippon Kayaku K.K.) as the liquid epoxy resin, 11.0 parts of an acid anhydride (methyltetrahydrophthalic anhydride MH700 by Shin-Nippon Rika K.K.) as the curing agent, 50.0 parts of spherical silica, 0.5 part of a silane coupling agent (γ-glycidoxypropyltrimethoxysilane KBM-403 by Shin-Etsu Chemical Co., Ltd.), and 6.0 parts of a curing accelerator (complex salt of cycloamidine compound with quaternary boron compound, U-CAT 5002 by Asahi Kasei Kogyo K.K.).

The spherical silica used herein had a particle size distribution as shown in Table 1 and FIGS. 1 to 4 after removal of a 325-mesh (screen opening 44 μm) oversize fraction.

A pair of glass plates spaced to define a gap of 40 μm were rested on a hot plate and heated at 100° C., whereupon each epoxy resin composition placed at one end of the gap infiltrated through the gap. The infiltration time was measured until the composition infiltrated and reached a distance of 20 mm from the end. Separately, each epoxy resin composition was cured at 150° C. for 2 hours whereupon the cured sample was measured for a modulus of elasticity.

Comparative Example 1

An epoxy resin composition was prepared as in Examples except that the inorganic filler had a particle size distribution as shown in Table 1 and FIG. 5 after removal of a 100-mesh (screen opening 149 μm) oversize fraction. The composition was similarly tested.

Comparative Example 2

An epoxy resin composition was prepared as in Examples except that after a 325-mesh oversize fraction was removed from the inorganic filler, part of the oversize fraction was intentionally added upon compounding so that the inorganic filler had a particle size distribution as shown in Table 1. The composition was similarly tested. It is noted that the inorganic filler prior to the intentional addition of the oversize fraction had the same particle size distribution as FIG. 3.

Comparative Example 3

Figure 6:
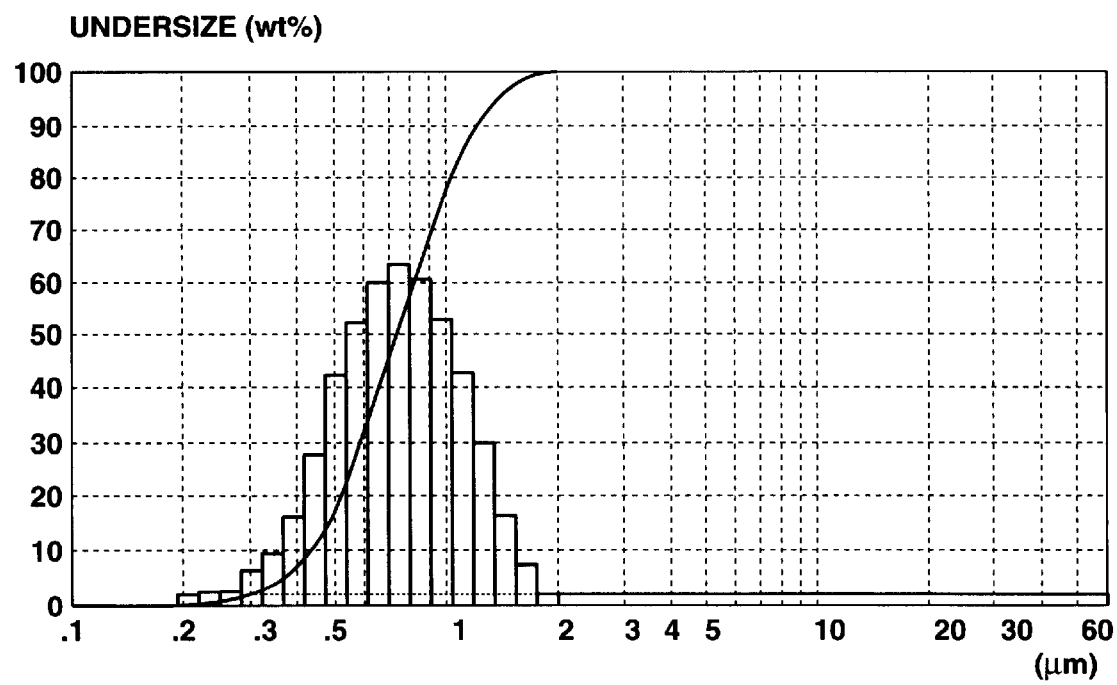
FIG. 6 is a diagram showing a particle size distribution of silica particles in Comparative Example 3.

An epoxy resin composition was prepared as in Examples except that the inorganic filler was silica having a mean particle size of 0.75 μm and a particle size distribution as shown in Table 1 and FIG. 6. The composition was similarly tested.

Comparative Example 4

Figure 7:
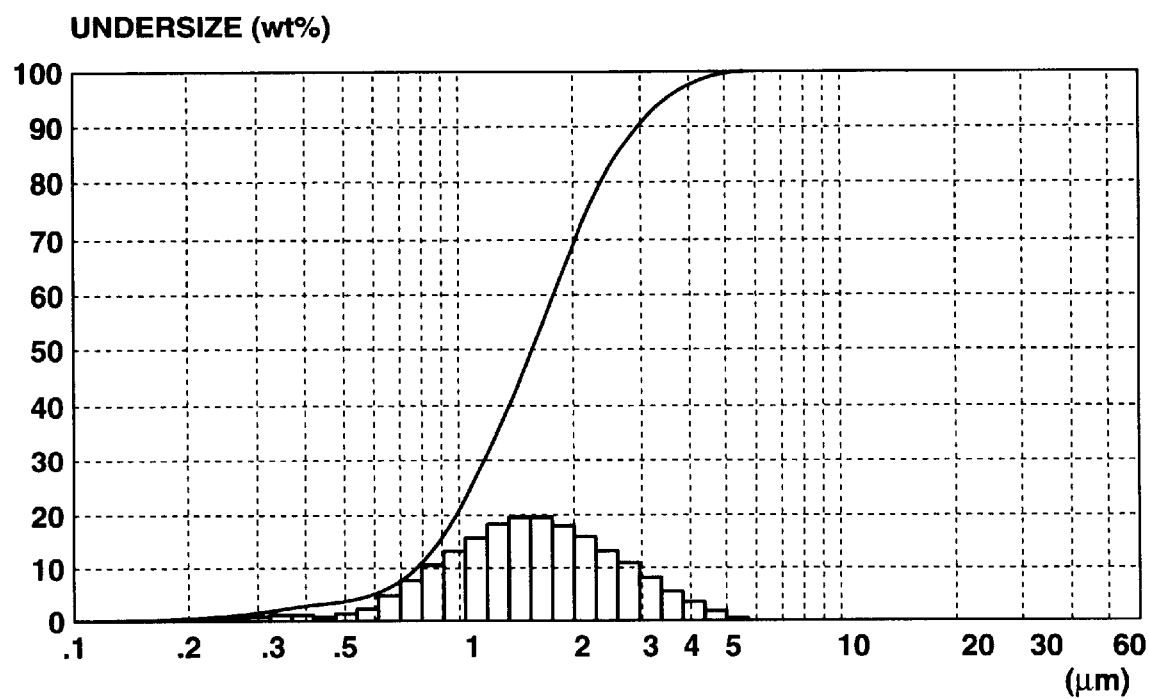
FIG. 7 is a diagram showing a particle size distribution of silica particles in Comparative Example 4.

An epoxy resin composition was prepared as in Examples except that the inorganic filler was silica having a mean particle size of 1.53 μm and a particle size distribution as shown in Table 1 and FIG. 7. The composition was similarly tested.

The results of infiltration time and modulus of elasticity are shown in Table 1.

TABLE 1

|  | E1 | E2 | E3 | E4 | CE1 | CE2 | CE3 | CE4 |
| --- | --- | --- | --- | --- | --- | --- | --- | --- |
| Sieve No. (mesh) | 325 | 325 | 325 | 325 | 100 | 325 | 325 | 325 |
| Amount of 325-mesh oversize fraction added (%) | 0 | 0 | 0 | 0 | 0 | 2 | 0 | 0 |
| Content of 45 μm and larger particles (ppm) | 8 | 15 | 2 | 5 | 530 | 20,000 | 5 | 2 |
| Mean particle size (μm) | 2.6 | 2.1 | 1.6 | 1.3 | 5.2 | 1.6 | 0.8 | 1.5 |
| X (% by weight) | 38.2 | 44.9 | 52.3 | 58.8 | 23.3 | 52.3 | 84.1 | 65.9 |

TABLE 1-continued

|  | E1 | E2 | E3 | E4 | CE1 | CE2 | CE3 | CE4 |
|---|---|---|---|---|---|---|---|---|
| Y (% by weight) | 24.8 | 21.7 | 18.1 | 14.7 | 27.0 | 18.1 | 0 | 0.3 |
| X/Y | 1.54 | 2.07 | 2.89 | 4.00 | 0.86 | 2.89 | ∞ | 220 |
| Infiltration time (sec) | 270 | 240 | 250 | 230 | reached short | 600 | not infiltrated | 250 |
| Modulus of Elasticity (N/mm$^2$) | 520 | 490 | 510 | 490 | 650 | 580 | 730 | 670 |

It is noted that X denotes the content (wt %) of particles with a particle size of 0.5 to 2 μm, and Y denotes the content (wt %) of particles with a particle size of 5 to 10 μm.

There has been described a liquid epoxy resin composition which ensures effective infiltration through a narrow gap and yields a low modulus cured product so that the composition is best suited for sealing semiconductor devices.

Japanese Patent Application No. 11-321745 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A semiconductor-sealing liquid epoxy resin composition comprising (A) a liquid epoxy resin, (B) a curing agent, and (C) an inorganic filler, wherein
    said inorganic filler contains up to 1% by weight of particles having a particle size of at least 45 μm, has a mean particle size of 1 to 5 μm, and has a particle size distribution having a peak in a particle size range of 0.5 to 2 μm and a peak in a particle size range of 5 to 10 μm wherein the content in % by weight of particles falling within the particle size range of 0.5 to 2 μm divided by the content in % by weight of particles falling within the particle size range of 5 to 10 μm is from 1 to 20.

2. The composition of claim 1 for use as an underfill material for flip-chip type semiconductor devices.

* * * * *